Figure 1:
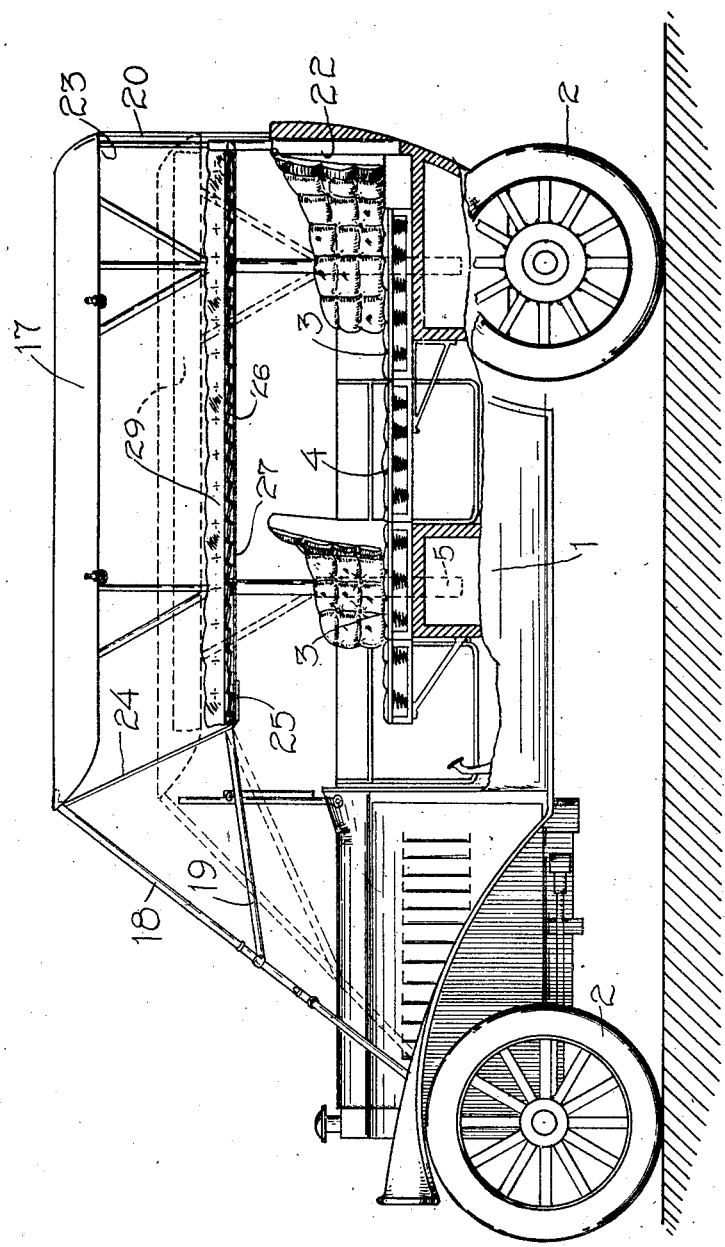

C. A. GREEN.
AUTOMOBILE ATTACHMENT.
APPLICATION FILED SEPT. 18, 1913.

1,112,003.

Patented Sept. 29, 1914.
2 SHEETS—SHEET 1.

Witnesses
C. V. P. Newbold
H. Kaye Martin

Inventor
C. A. Green
By
Attorney

C. A. GREEN.
AUTOMOBILE ATTACHMENT.
APPLICATION FILED SEPT. 18, 1913.
1,112,003.
Patented Sept. 29, 1914.
2 SHEETS—SHEET 2.
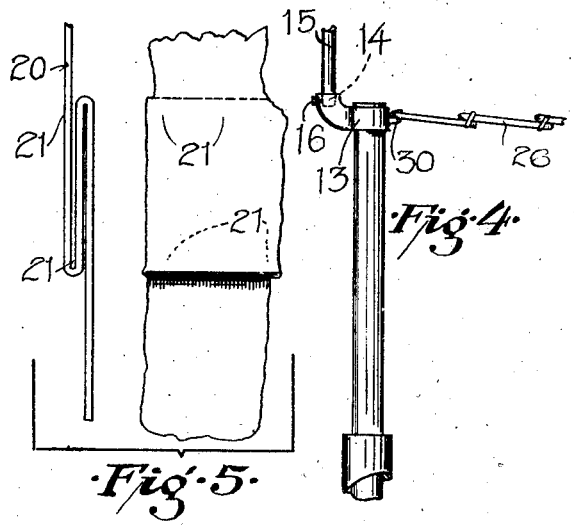
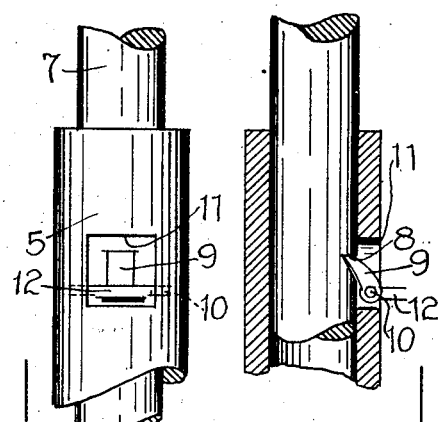
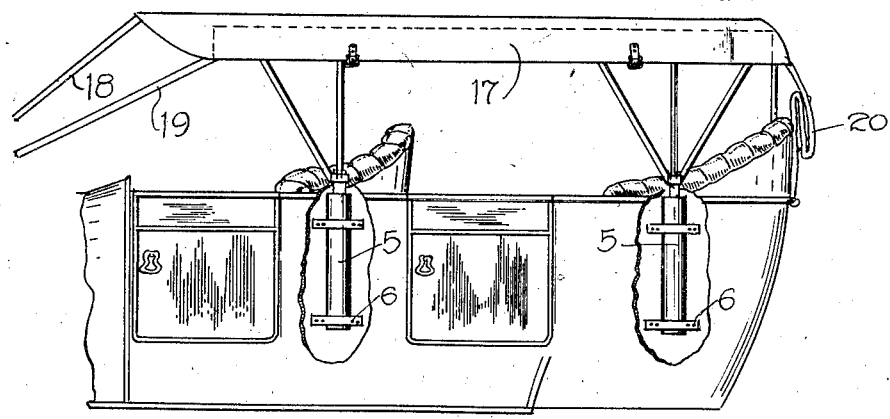
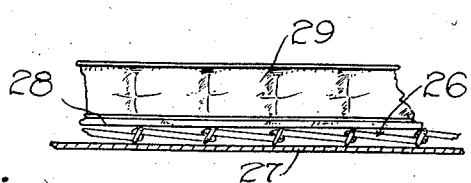
Witnesses
C. W. P. Newbold
H. Kaye Martin
Inventor
C. A. Green
By [signature]
Attorney

UNITED STATES PATENT OFFICE.

CHARLES A. GREEN, OF PORTLAND, OREGON.

AUTOMOBILE ATTACHMENT.

1,112,003.

Specification of Letters Patent. Patented Sept. 29, 1914.

Application filed September 18, 1913. Serial No. 790,466.

*To all whom it may concern:*

Be it known that I, CHARLES A. GREEN, a citizen of the United States, residing at Portland, in the county of Multnomah and State of Oregon, have invented certain new and useful Improvements in Automobile Attachments; and I do hereby declare the following to be a full, clear, and exact description of the invention, such as will enable others skilled in the art to which it appertains to make and use the same.

This invention relates to new and useful improvements in automobile attachments and has for its object the provision of a device which may be applied to an automobile of the usual construction, without materially changing any of the parts thereof.

Another object of my invention is the provision of such a device which when in use will form a bed to accommodate the occupants of the automobile in which the same is to be used.

A further object of my invention is the provision of a device which may be easily and quickly adjusted and put in position for sleeping purposes.

A still further object of my invention is the provision of such a device which will normally be held from view and, thereby present the appearance of an ordinary car.

With the above and other objects in view I will now proceed to describe my invention in the following specification and accompanying drawings, in which, Figure 1 is a longitudinal sectional view of an automobile showing the attachment as it would appear when in position for use, the dotted lines indicate the position of the parts when not in use. Fig. 2 is a side view of the body of an automobile showing a portion of the sides broken away to illustrate the method of securing the supporting members in position. Fig. 3 is an enlarged detail view of the supporting members, Fig. 4 is an enlarged detail view showing the method of securing the spring to the supporting members, Fig. 5 is an enlarged view of the back curtain, and Fig. 6 is an enlarged detail sectional view of the spring showing the mattress in position thereon.

Referring to the drawings by characters of reference 1 indicates the body of an automobile to which are secured the usual wheels 2. This body 1 is preferably provided with the seats 3 which are adapted to coöperate with the back 4 to form a bed when in the position illustrated in Fig. 1. I will not endeavor to describe the particular method of forming such a bed as that has no bearing upon this invention.

Suitably secured intermediate the sides of the car and the upholstery thereof I preferably provide the cylindrical tubes 5 which are held rigidly therein by means of the clamps or other supporting means 6. These cylindrical tubes extend from a point near the floor of the car to the upper edge of the sides and are adapted to receive the supports 7 which slide thereinto as will be clearly seen upon referring to the drawings. Suitable notches 8 are formed near the lower ends of the supports 7 and are adapted to receive the free ends of the pawls 9 which are pivoted, as illustrated at 10, in a slot 11 which is formed in the cylindrical member 5. Suitable thumb pieces 12 are formed integrally with the pawls 9, as clearly illustrated in Fig. 3 and are adapted to form a means, whereby the free ends of the pawls may be released from their position in the notches.

Suitable sleeves 13 are secured to the upper ends of the supports 7 and have formed integrally therewith the outwardly extending angular projections 14 which are provided with suitable recesses in which the ends of the top supporting rods 15 are adapted to be secured. These rods 15 are held in the sockets 14 by means of suitable set screws 16. These top supporting rods 15 are formed in the usual manner and are adapted to act as supports for the top 17 which extends substantially throughout the entire length of the body of the car. To the forward end of the top and adjacent the sides thereof I preferably secure the usual tension straps 18 having secured intermediate their ends the straps 19, the ends of which are secured as shown in Fig. 1 to the forward end of the spring which will be more fully hereinafter described.

The rear curtain which is indicated generally by the numeral 20 is provided with suitable fasteners 21, which are adapted to hold said curtain in the position, illustrated in Fig. 5, when the parts of the car are in position for driving.

A suitable cylindrical member 22 is secured intermediate the ends of the back, as clearly shown in Fig. 1 and is adapted to receive the support 23, the upper end of which is attached to the top 17. Thus, it will be seen that I provide a suitable support for the rear end of the top and, thereby minimize any danger of breakage, or the like, at said rear end.

A suitable curtain 24 having its lower end 25 secured to the spring is provided and is supported by means of the front edge of the top as will be clearly seen upon referring to Fig. 1.

The spring illustrated generally by the numeral 26 is preferably provided with a suitable cover 27, which extends beneath the lower surface thereof, and is tufted at suitable intervals to more firmly hold the same in place. A cover 28, similar to the cover 27, is secured to the upper surface of the mattress as shown and is adapted to form a rest for the mattress 29 when the device is in use.

It will be clearly seen that when it is desired to make use of my improved device the same is attached to a car preferably of the type having the seats so arranged as to form a bed, by means of the cylindrical members 5 and 22. It will be apparent that the parts in their assembled position, as shown in Fig. 2, will be hidden from view and the car will present the appearance of an ordinary touring car. When the top is raised as shown in Fig. 1 it will be obvious that the same will be held in its raised position by means of the pawls 9 which engage in the notches 8 and the springs and mattress carried thereby may be lowered from their position under the top and the ends of the springs hooked over the hooks 30 which are carried by the sleeves 13, these sleeves being at the upper end of the supports 7 it is obvious that the mattress will be suspended intermediate the top and the seats of the car. When it is again desired to place the car in condition for travel the mattress is raised to its position in the top 17 and held therein by means of suitable transversely extending straps. The user then releases the pawls 9 from their position in the notches 8 and it will be apparent that the supports 7 would slide into the cylindrical members 5 thereby lowering the top and placing the same in position for travel.

While in the foregoing I have shown and described the preferred embodiment of my invention I wish it to be understood that I may change the specific arrangement and combination of parts without in any way departing from the spirit and scope of my invention as defined in the appended claims.

What is claimed is:—

1. In combination with an automobile body having convertible seats, a top carried by said body, and a bed spring suspended from said top and arranged to be hidden thereby when not in use.

2. In combination with a vehicle body, a top carried by said body, said top being adapted to be adjusted vertically, and a bed spring supported by said top and arranged to be hidden thereby when not in use.

3. In combination with a vehicle body having convertible seats, cylindrical tubes carried by said body intermediate the upholstery and the side walls thereof, supports slidably mounted in said tubes, said supports having a top carried by their upper extremities, and a bed spring so located as to be covered by the top when it is not in use.

4. In a device of the character described the combination of an automobile body having convertible seats, means carried by said body to support a top, a top secured to the upper extremity of the supporting means, and a bed supported by said top and so located as to be hidden thereby when the device is not in use.

5. The combination with an automobile body, a top supported thereby, means formed on the support for the top and adapted to support a bed, said bed being so located as to be hidden from view when not in use.

6. In combination with an automobile body having convertible seats, cylindrical tubes secured to the body intermediate its sides and the upholstery, supports slidably mounted in said tubes, means at the upper ends of said supports to hold a top, a bed, hooks secured to the upper ends of the supports, said hooks being adapted to hold the bed and curtains secured to the bed and to the top to support the ends of said bed.

7. In combination with an automobile body having convertible seats, a top, cylindrical tubes secured to the side walls of the body, supports slidably mounted in the tubes, means connected to the upper extremities of the supports to support said top, a bed, hooks secured to the upper extremity of the supports, means at each end of the top to suspend the bed when the same is in its operative position, and means secured to the top to hold the bed in its inoperative position.

In testimony whereof I affix my signature in presence of two witnesses.

CHARLES A. GREEN.

Witnesses:
Wm. G. Beck, Jr.,
Edna Catlow.